United States Patent
Kakimoto

(10) Patent No.: US 8,358,471 B2
(45) Date of Patent: Jan. 22, 2013

(54) ZOOM LENS AND IMAGE PICKUP DEVICE INCLUDING THE SAME

(75) Inventor: Tsuyoshi Kakimoto, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 12/905,233

(22) Filed: Oct. 15, 2010

(65) Prior Publication Data

US 2011/0096408 A1   Apr. 28, 2011

(30) Foreign Application Priority Data

Oct. 28, 2009   (KR) .................. 10-2009-0102817

(51) Int. Cl.
*G02B 15/14* (2006.01)
(52) U.S. Cl. .................................................. 359/687
(58) Field of Classification Search .................. 359/687
See application file for complete search history.

(56) References Cited

U.S. PATENT DOCUMENTS

| | | | | |
|---|---|---|---|---|
| 5,585,966 A * | 12/1996 | Suzuki | ............ | 359/557 |
| 7,477,455 B2 * | 1/2009 | Satori | ............ | 359/687 |
| 2009/0109546 A1 * | 4/2009 | Watanabe et al. | ............ | 359/687 |
| 2009/0168195 A1 * | 7/2009 | Watanabe | ............ | 359/687 |
| 2009/0174952 A1 * | 7/2009 | Satori | ............ | 359/687 |
| 2009/0251796 A1 * | 10/2009 | Yamano et al. | ............ | 359/687 |
| 2010/0296172 A1 * | 11/2010 | Omichi | ............ | 359/687 |

FOREIGN PATENT DOCUMENTS

| | | |
|---|---|---|
| JP | 2004-212616 A | 7/2004 |
| JP | 2007-256604 A | 10/2007 |
| JP | 2007-286492 A | 11/2007 |

\* cited by examiner

*Primary Examiner* — William Choi
(74) *Attorney, Agent, or Firm* — Drinker Biddle & Reath LLP

(57) ABSTRACT

A zoom lens and an image pickup device. The zoom lens includes sequentially from an object side a first lens group having a positive refractive power, a second lens group having a negative refractive power, a third lens group having a positive refractive power, and a fourth lens group having a positive refractive power, which are arranged in order from an object side to an image side, wherein, when the zoom lens is zoomed from a wide angle position to a telephoto position, all of the first lens group, the second lens group, the third lens group, and the fourth lens group move relative to one another so that a distance between the first lens group and the second lens group increases, a distance between the second lens group and the third lens group reduces, and a distance between the third lens group and the fourth lens group increases.

18 Claims, 10 Drawing Sheets

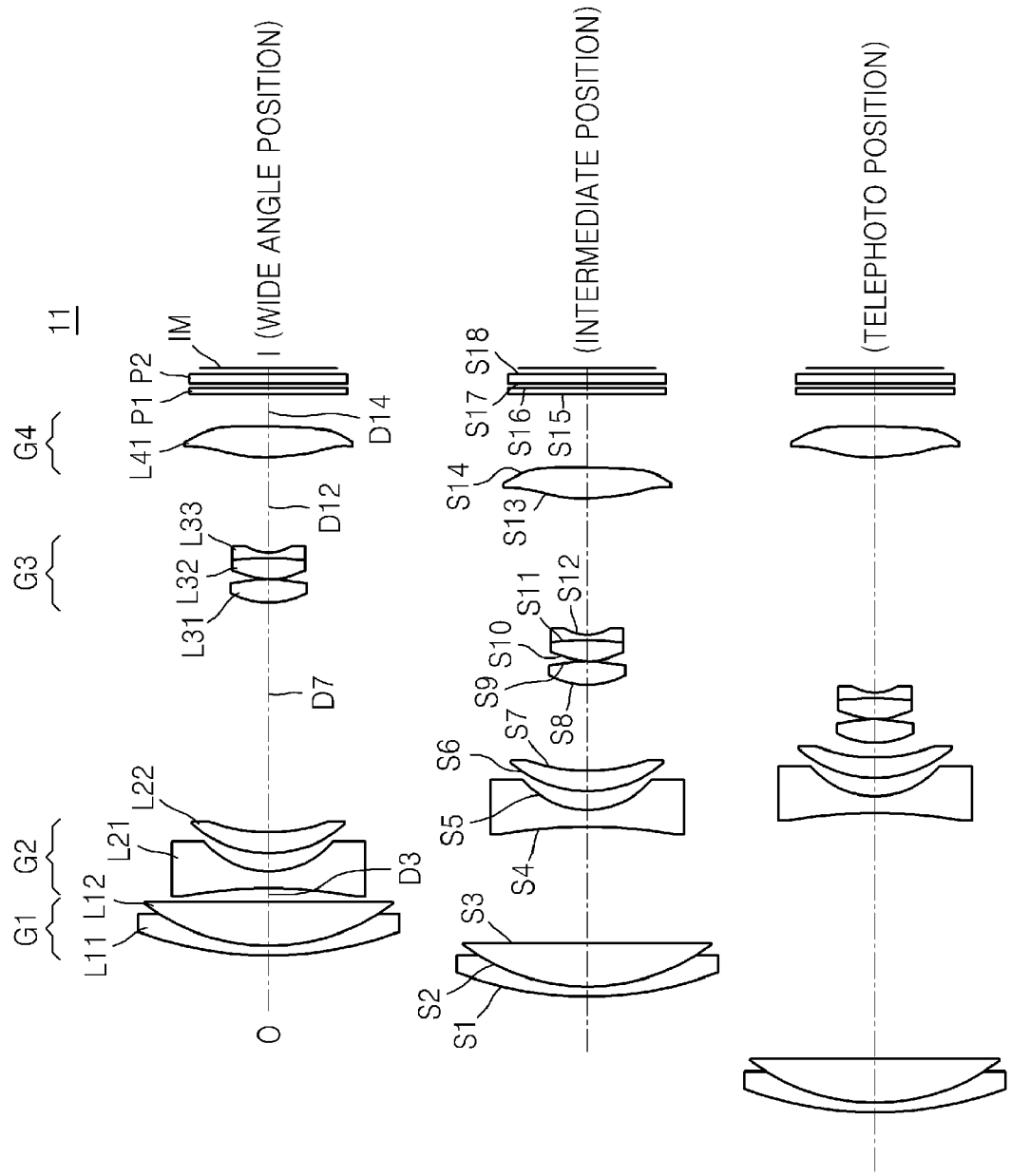

ZOOM LENS AND IMAGE PICKUP DEVICE INCLUDING THE SAME

CROSS-REFERENCE TO RELATED PATENT APPLICATIONS

This application claims the benefit of Korean Patent Application No. 10-2009-0102817, filed on Oct. 28, 2009, in the Korean Intellectual Property Office, the entire disclosure of which is incorporated herein by reference.

BACKGROUND

1. Field of the Invention

Embodiments, of the invention relates to a zoom lens which has a reduced size and a larger zoom magnification, and an image pickup device including the zoom lens.

2. Description of the Related Art

Often, digital cameras or video cameras include an image sensor, such as a charge coupled device (CCD) or complementary metal oxide semiconductor (CMOS). The demand for camera modules having mega pixel resolutions has increased, and some cameras have resolutions approaching 100 million pixels and excellent image quality. Image forming optical devices such as digital cameras using a CCD or CMOS or mobile phone cameras are designed to be small in size, light weight, and of low cost. Furthermore, there is an increasing demand for cameras capable of wide angle shots so that a user can photograph a subject at a wider angle.

SUMMARY

Therefore, there is a need in the art for a zoom lens having a shorter overall length and a higher zoom magnification.

Embodiments of the invention provide an image pickup device including a zoom lens having a shorter overall length and a higher zoom magnification.

According to embodiments of the invention, there is provided a zoom lens including: a first lens group having a positive refractive power, a second lens group having a negative refractive power, a third lens group having a positive refractive power, and a fourth lens group having a positive refractive power, which are arranged in order from an object side to an image side, wherein, when the zoom lens is zoomed from a wide angle position to a telephoto position, all of the first lens group, the second lens group, the third lens group, and the fourth lens group move relative to one another so that a distance between the first lens group and the second lens group increases, a distance between the second lens group and the third lens group reduces, a distance between the third lens group and the fourth lens group increases, and the first lens group comprises a negative lens and a positive lens.

The zoom lens may satisfy the following expression:

$$1.9 < nd1n < 2.1$$

$$1.7 < nd1p < 2.1$$

$$15 < vd1p - vd1n$$

wherein, nd1n denotes a refractive index with respect to a line d of the negative lens included in the first lens group, nd1p denotes a refractive index with respect to the line d of the positive lens included in the first lens group, vd1n denotes an Abbe number of the negative lens included in the first lens group, and vd1p denotes an Abbe number with respect to the line d of the positive lens included in the first lens group.

The zoom lens may satisfy the following expression:

$$0.3 < D3t/Lt < 0.5$$

wherein, D3t denotes an air gap distance between the first lens group 1 and the second lens group on an optical axis at a telephoto position, and Lt denotes a distance from the vertex of the lens closest to an object side of the first lens group at a telephoto position to an image plane on the optical axis.

The zoom lens may satisfy the following expression:

$$0.5 < |f2/fw| < 2$$

$$0.5 < f3/fw < 3$$

wherein, f2 denotes a focal length of the second lens group, f3 denotes a focal length of the third lens group, and fw denotes a total focal length at a wide angle position.

The zoom lens may satisfy the following expression.

$$0.8 < T1/T3 < 1.5$$

wherein, T1 denotes a distance of movement of the first lens group in a direction of an optical axis when the zoom lens is zoomed from a wide angle position to a telephoto position, and T3 denotes a distance of movement of the third lens group in a direction of the optical axis when the zoom lens is zoomed from a wide angle position to a telephoto position.

The zoom lens may satisfy the following expression.

$$0.2 < Da/ft < 0.4$$

wherein, Da denotes a total sum of thicknesses of the first through fourth lens groups on an optical axis, and ft denotes a total focal length of the zoom lens at a telephoto position.

The negative lens and the positive lens of the first lens group may include a doublet lens.

The second lens group may include a negative lens and a positive lens.

Both surfaces of the negative lens of the second lens group may be aspherical.

The third lens group may include a positive lens and a doublet lens of the positive lens and a negative lens.

The positive lens of the third lens group closest to the object side may include at least one aspherical surface.

The fourth lens group may include a positive lens.

The fourth lens group may include at least one aspherical lens.

The zoom lens may satisfy the following expression.

$$5.0 < ft/fw < 10.0$$

wherein, ft denotes a focal length at a telephoto position, and fw denotes a focal length at a wide angle position.

The third lens group may move perpendicularly to an optical axis to compensate for a hand shake.

According to embodiments of the invention, there is provided an image pickup device including: a zoom lens; and an imaging sensor for receiving an optical image formed by the zoom lens, wherein the zoom lens comprises a first lens group having a positive refractive power, a second lens group having a negative refractive power, a third lens group having a positive refractive power, and a fourth lens group having a positive refractive power, which are arranged in order from an object side to an image side, wherein, when the zoom lens is zoomed from a wide angle position to a telephoto position, all of the first lens group, the second lens group, the is third lens group, and the fourth lens group move relative to one another so that a distance between the first lens group and the second lens group increases, a distance between the second lens group and the third lens group reduces, a distance between the third lens group and the fourth lens group increases, and the first lens group comprises a negative lens and a positive lens.

The zoom lens may satisfy the following expression:

$$1.9 < nd1n < 2.1$$

$$1.7 < nd1p < 2.1$$

$$1.5 < vd1p - vd1n$$

wherein, nd1n denotes a refractive index with respect to a line d of the negative lens included in the first lens group, nd1p denotes a refractive index with respect to the line d of the positive lens included in the first lens group, vd1n denotes an Abbe number of the negative lens included in the first lens group, and vd1p denotes an Abbe number with respect to the line d of the positive lens included in the first lens group.

BRIEF DESCRIPTION OF THE DRAWINGS

The above and other embodiments of the invention will become more apparent by describing in detail exemplary embodiments thereof with reference to the attached drawings in which:

FIG. 1 illustrates a structural arrangement of a zoom lens according to embodiments of the invention;

DETAILED DESCRIPTION OF THE INVENTION

Figure 2A:
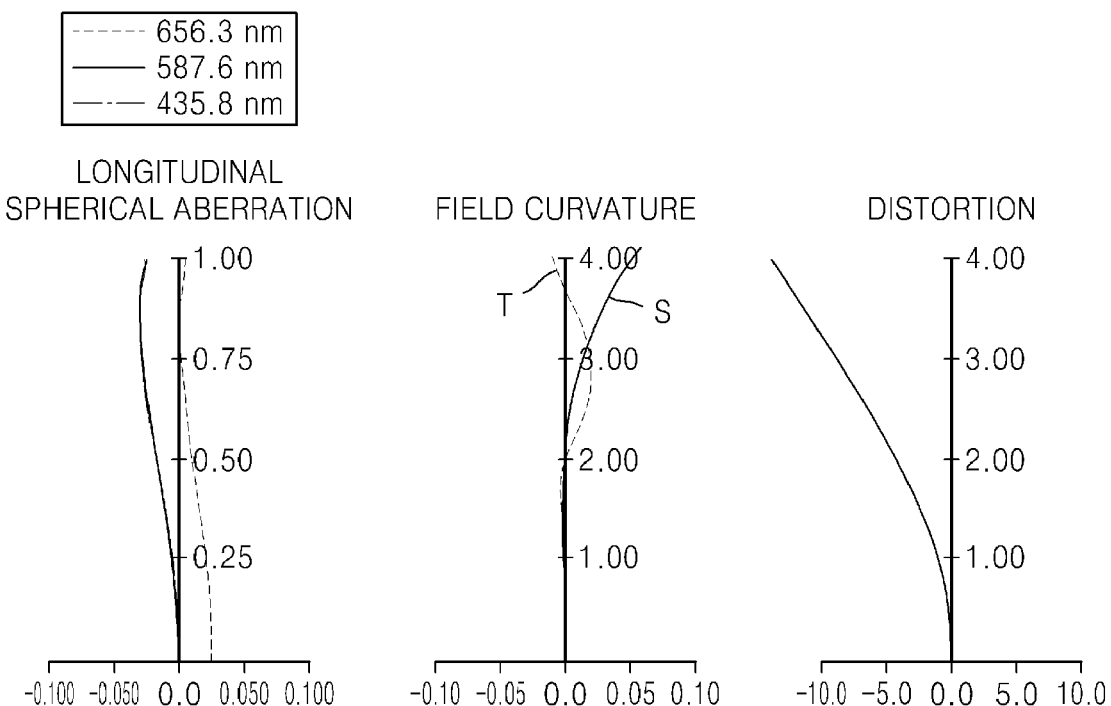
FIG. 2A is a graph showing an aberration at a wide angle position of the zoom lens illustrated in FIG. 1, according to embodiments of the invention.

Embodiments of the invention will now be described in detail by explaining exemplary embodiments of the invention with reference to the attached drawings.

FIG. 1 illustrates a structural arrangement of a zoom lens according to embodiments of the invention. Referring to FIG. 1, the zoom lens may include a first lens group G1 having a positive refractive power, a second lens group G2 having a negative refractive power, a third lens group G3 having a positive refractive power, and a fourth lens group G4 having a positive refractive power, which are arranged sequentially in order from an object side O to an image side I.

When the zoom lens is zoomed from a wide angle position to a telephoto position, all of the first lens group G1, the second lens group G2, the third lens group G3, and the fourth lens group G4 move relative to one another so that a distance between the first lens group G1 and the second lens group G2 increases, a distance between the second lens group G2 and the third lens group G3 reduces, and a distance between the third lens group G3 and the fourth lens group G4 increases.

In order to realize a zoom lens having a small size, when the zoom lens is retractable, a whole lens system needs to have a small thickness. In order to make the lens system small and thin, the total number of zoom lenses needs to be reduced. The zoom lens shown in FIG. 1 includes 8 lenses in total, which makes the zoom lens smaller. The first lens group G1 and the third lens group G3 includes doublet lenses, which reduces a distance between lenses, thereby making the zoom lens much smaller.

The first lens group G1 may include a first lens L11 and a second lens L12 which are arranged in order from the object side O to the image side I. For example, the first lens L11 may be a negative lens, the second lens L12 may be a positive lens, and the negative lens and the positive lens may constitute a doublet lens. The second lens group G2 may include a third lens L21 and a fourth lens L22. The third lens L21 may be a negative lens. The fourth lens L22 may be a positive lens. Both surfaces of the negative lens of the second lens group G2 may be aspherical. A position of an incident light of the second lens group G2 may greatly vary so as to reduce the overall length of the zoom lens and increase a zoom magnification. In this regard, the second lens group G2 includes an aspherical surface, thereby compensating for off-axis aberration at a wide angle.

The third lens group G3 may include a fifth lens L31, a sixth lens L32, and a seventh lens L33. The fifth lens L31 is a positive lens. The sixth lens L32 is a positive lens. The seventh lens L33 is a negative lens. The sixth lens L32 and the seventh lens L33 may constitute a doublet lens. A positive lens of the third lens group G3 closest to the object side O may have at least one aspherical surface, thereby compensating for spherical aberration and comma aberration that occur in the third lens group G3 and forming the third lens group G3 having a high refractive index. Thus, miniaturization of the zoom lens may be achieved. The third lens group G3 moves perpendicularly to an optical axis, thereby compensating for a user's hand shaking. The fourth lens group G4 may include an eighth lens L41. For example, the eighth lens L41 may be a positive lens. The eighth lens L41 may have at least one aspherical surface, thereby efficiently compensating for astigmatism that is not compensated for in the first through third lens groups G1 through G3. For example, it is advantageous to compensate for astigmatism at an intermediate position.

Meanwhile, since a height of off-axis light increases from the optical axis in the first and second lens groups G1 and G2, a lens needs to have a relatively thick edge portion in order to obtain an optical amount of off-axis light. However, a thick edge portion of a lens easily increases a thickness of the lens on an optical axis. If the number of lenses of the first and second lens groups G1 and G2 increases, since a position of an incident light is farther away from the object side O, the height of off-axis light that passes through the first and second lens groups G1 and G2 further increases, which increases the thickness of the lens on the optical axis. As described above, an increase in the number of lenses results in an increase in the thickness of lenses on the optical axis. Therefore, an increase in the number of lenses causes an increase in diameter of a corresponding lens group or an increase in the thickness of lenses on the optical axis, which makes it difficult to miniaturize the zoom lens. For example, each of the first and second lens groups G1 and G2 includes two lenses, thereby achieving miniaturization of the zoom lens.

The third lens group G3 which greatly contributes to a zooming operation includes three lenses, thereby compensating for aberration and achieving high performance. A smaller number of lenses of the third lens group G3 makes it possible to achieve miniaturization of the zoom lens. In addition, the fourth lens group G4 includes a single lens, thereby achieving miniaturization of the zoom lens.

In embodiments, all of the first through fourth lens groups G1 through G4 move relative to one another, which efficiently distributes a zooming function to each lens group, thereby preventing an aberration variation during zooming, and obtaining a high zooming magnification. The amount of movement of each lens group is reduced, thereby achieving miniaturization of the zoom lens.

The zoom lens may satisfy the following equation, $$1.9 < nd1n < 2.1 \qquad 1)$$

wherein, nd1n denotes a refractive index with respect to a line d of a negative lens included in the first lens group G1. If the refractive index of the negative lens included in the first lens group G1 is greater than the upper limit of equation 1, it is difficult to commercialize or obtain a material, which increases manufacturing costs. If the refractive index of the negative lens included in the first lens group G1 is less than the lower limit of equation 1, it is necessary to increase a curvature absolute value of a lens surface in order to obtain a desired refractive power. If the curvature absolute value increases, it is difficult to compensate for distortion aberration or astigmatic field curvature at a wide angle position or comma aberration at a wide angle position and at a telephoto position.

The zoom lens may satisfy the following equation, $$1.7 < nd1p < 2.1 \qquad 2)$$

wherein, nd1p denotes a refractive index with respect to a line d of a positive lens included in the first lens group G1. If the refractive index of the negative lens included in the first lens group G1 is greater than the upper limit of equation 2, it is difficult to commercialize or obtain a material, which increases manufacturing costs. If the refractive index of the negative lens included in the first lens group G1 is less than the lower limit of equation 2, it is necessary to increase a curvature absolute value of a lens surface in order to obtain a desired refractive power. If the curvature absolute value increases, it is difficult to compensate for distortion aberration or astigmatic field curvature at a wide angle position or comma aberration at a wide angle position and at a telephoto position. Furthermore, it is required to increase a thickness of a lens on the optical axis in order to obtain a thickness of an edge portion of the lens, which makes it difficult to miniaturize the first lens group G1.

The zoom lens may satisfy the following equation, $$1.5 < vd1p - vd1n \qquad 3)$$

wherein, vd1n denotes an Abbe number of the negative lens included in the first lens group G1, and vd1p denotes an Abbe number with respect to a line d of the positive lens included in the first lens group G1. If (vd1p−vd1n) is less than the lower limit of equation 3, when a zooming magnification increases, chromatic aberration as well as spherical aberration may greatly vary.

The zoom lens may satisfy the following equation, $$0.3 < D3t/Lt < 0.5 \qquad 4)$$

wherein, D3t denotes an air gap distance between the first lens group G1 and the second lens group G2 on the optical axis at a telephoto position, and Lt denotes a distance from the vertex of the lens closest to an object side of the first lens group G1 at a telephoto position to an image plane IM on the optical axis. If D3t/Lt is greater than the upper limit of equation 4, since the total length of the zoom lens increases at a telephoto position, it is difficult to reduce the size of a barrel in a thickness direction. If D3t/Lt is less than the lower limit of equation 4, since the power of each lens group increases, it is difficult to compensate for spherical aberration and increase the zooming magnification.

The zoom lens may satisfy the following equation, $$0.5 < |f2/fw| < 2 \qquad 5)$$

wherein, f2 denotes a focal length of the second lens group G2, and fw denotes a total focal length at a wide angle position. If |f2/fw| is greater than the upper limit of equation 5, since the power of the second lens group G2 is too weak, an amount of zooming movement of the zoom lens increases, which makes it difficult to miniaturize the zoom lens. If |f2/fw| is less than the lower limit of equation 5, although the overall length of the zoom lens is reduced, since the focal length of the second lens group G2 is reduced, it is difficult to compensate for spherical aberration, in particular, distortion aberration. The zoom lens may satisfy the following equation, $$0.5 < f3/fw < 3 \qquad 6)$$

wherein, f3 denotes a focal length of the third lens group G3. If f3/fw is greater than the upper limit of equation 6, it is necessary to increase a refractive power of the second lens group G2 or the fourth lens group G4 in order to obtain a greater zooming magnification. If the refractive power of the second lens group G2 or the fourth lens group G4 is increased, it is difficult to compensate for comma aberration or aspherical aberration at a telephoto position. If f3/fw is less than the lower limit of equation 6, since a refractive power of the third lens group G3 increases, it is difficult to compensate for aberration. Also, when the zoom lens moves in a direction vertical to the optical axis in order to compensate for a user's hand shaking, aberration greatly varies.

The zoom lens may satisfy the following equation, $$0.8 < T1/T3 < 1.5 \qquad 7)$$

wherein, T1 denotes a distance of movement of the first lens group G1 in a direction of the optical axis when the zoom lens is zoomed from a wide angle position to a telephoto position, and T3 denotes a distance of movement of the third lens group G3 in a direction of the optical axis when the zoom lens is zoomed from a wide angle position to a telephoto position. If T1/T3 is greater than the upper limit of equation 7, since the distance of movement of the first lens group G1 increases and a distance between the first lens group G1 and the second lens group G2 increases at a telephoto position, the total length of the zoom lens increases, which makes it difficult to miniaturize the zoom lens. Further, since a difference of the total length of the zoom lens increases between a wide angle position and a telephoto position, a thickness of cam used to drive the zoom lens increases, which increases the overall size of the zoom lens when the zoom lens is retracted. If T1/T3 is less than the lower limit of equation 7, since the distance of movement of the third lens group G3 increases, a distance of an incident light from the lens closest to an object side increases at a wide angle position, which increases the overall diameter of the zoom lens, thereby making it difficult to miniaturize the zoom lens.

The zoom lens may satisfy the following equation, $$0.2 < Da/ft < 0.4 \quad\quad 8)$$

wherein, Da denotes a total sum of thicknesses of the first through fourth lens groups G1 through G4 on the optical axis, and ft denotes a total focal length of the zoom lens at a telephoto position. If Da/ft is greater than the upper limit of equation 8, since the total sum of thicknesses of the first through fourth lens groups G1 through G4 increases, it is difficult to miniaturize the zoom lens when the zoom lens is retracted. If Da/ft is less than the lower limit of equation 8, since power of each of the first through fourth lens groups G1 through G4 increases, it is difficult to compensate for aberration.

The zoom lens may satisfy the following equation, $$5.0 < ft/fw < 10.0 \quad\quad 9)$$

If ft/fw is greater than the upper limit of equation 9, it is difficult to obtain satisfactory optical performance of the zoom lens or miniaturize the zoom lens. If ft/fw is less than the lower limit of equation 9, since the zooming magnification of the zoom lens is reduced, it is difficult to provide the zoom lens having a high zooming magnification.

Meanwhile, the aspherical shape of the zoom lens according to may be defined in the following equation.

The sag z of the aspherical surface of the zoom lens is defined when a proceeding direction of light is positive, wherein z denotes a distance from the vertex of the lens to the direction of the optical axis, h denotes a distance at a direction perpendicular to the optical axis, c denotes a curvature, k is a conic constant, A, B, C, and D are aspherical surface coefficients.

$$z = \frac{ch^2}{1 + \sqrt{(1 - (1+k)c^2 h^2)}} + Ah^4 + Bh^6 + Ch^8 + Dh^{10} \quad\quad 10)$$

Hereinafter, various embodiments of the invention will now be described.

Figure 3:
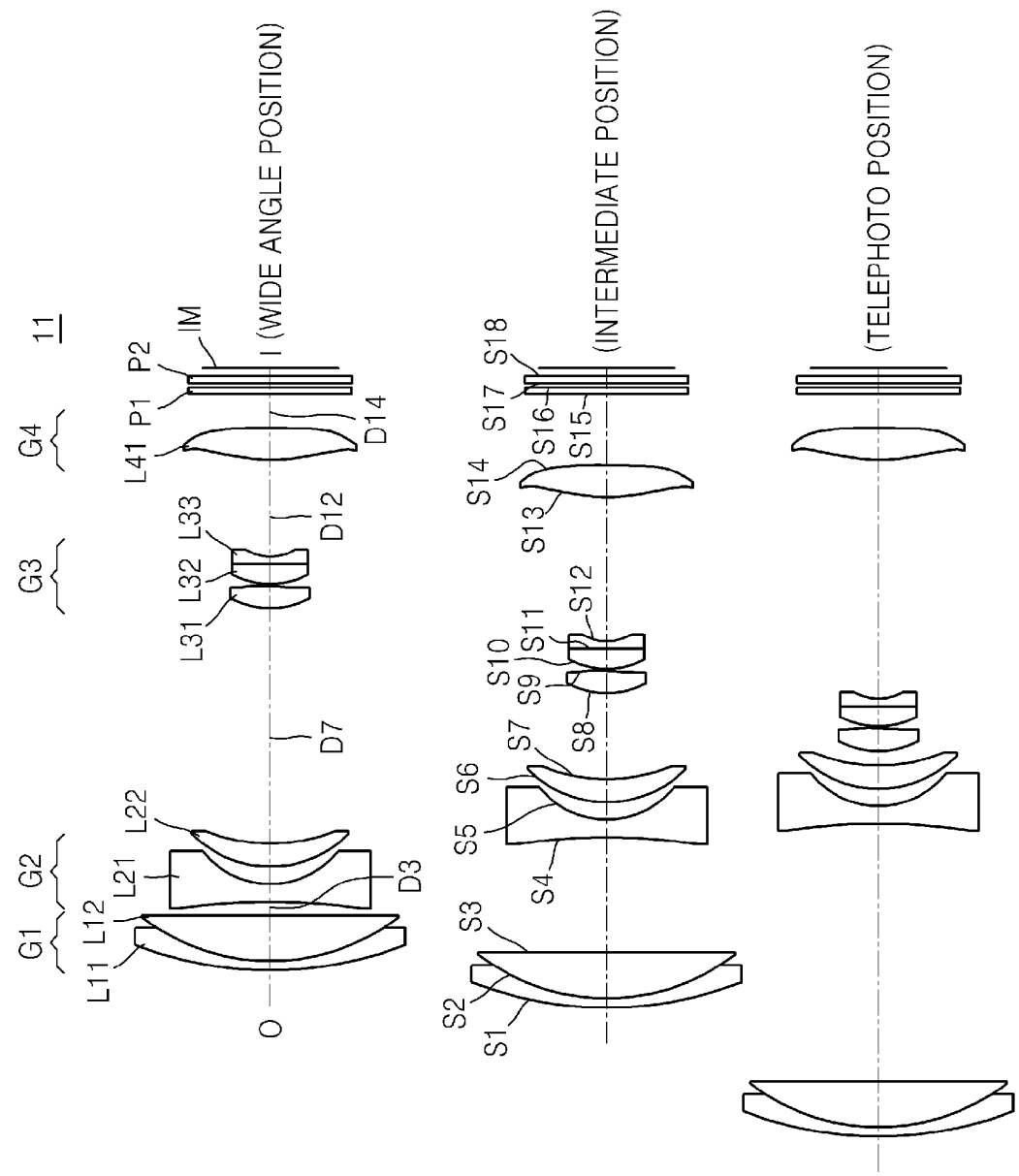
FIG. 3 illustrates a structural arrangement of a zoom lens according to other embodiments of the invention.
Figure 5:
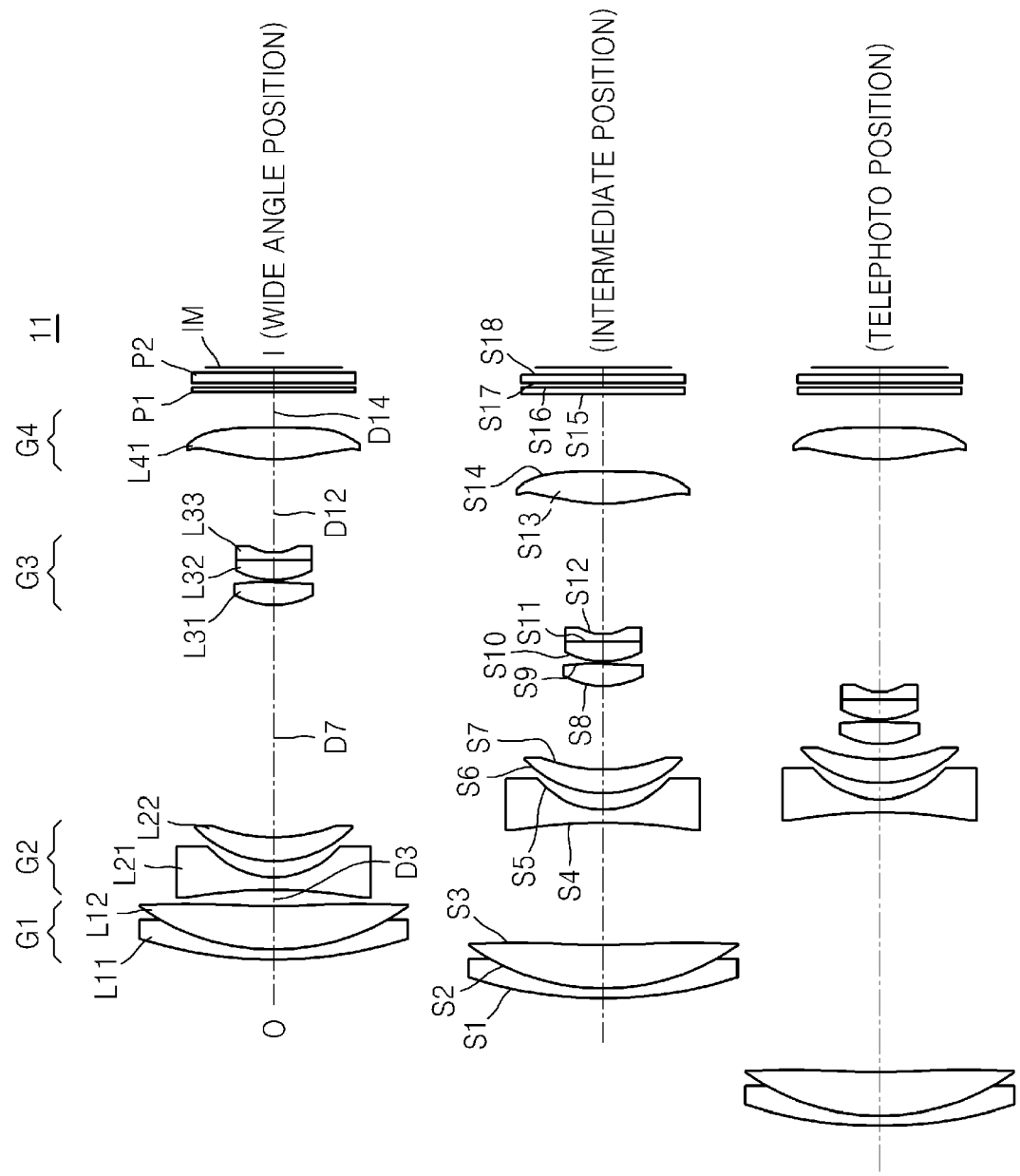
FIG. 5 illustrates a structural arrangement of a zoom lens according to other embodiments of the invention.

In FIGS. 1, 3, and 5, a straight line at the right most side represents the position of an image plane and an infrared (IR) blocking filter P1 or cover glass P2 of an imaging device is disposed at the object side O of the image plane.

Figure 2B:
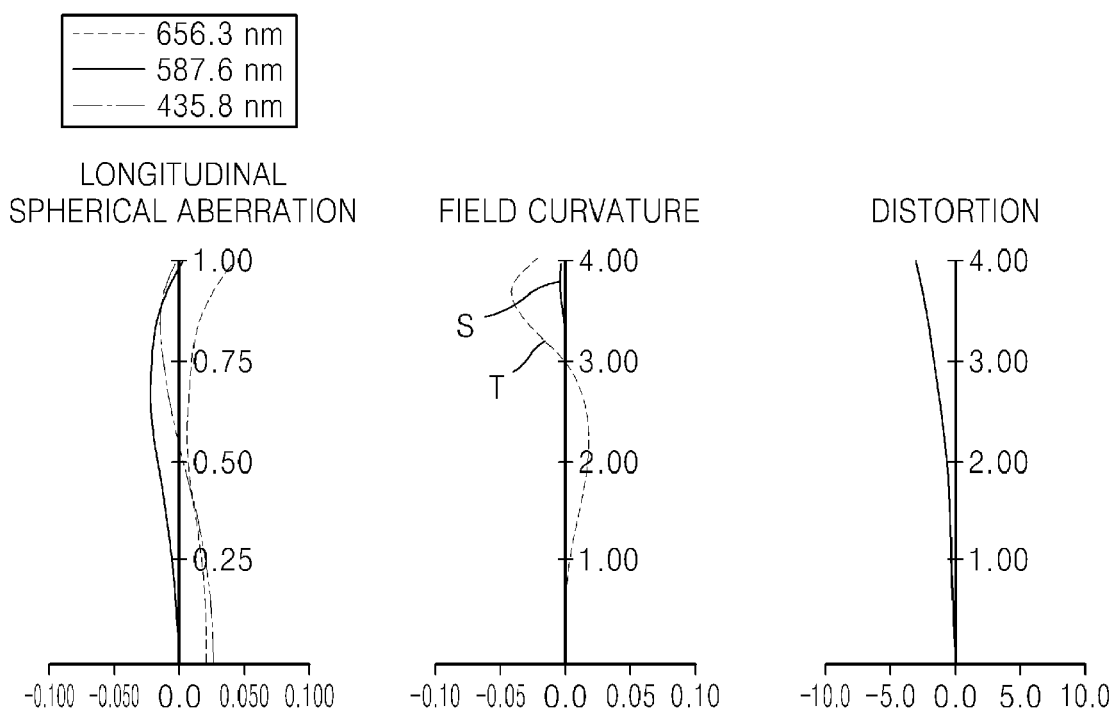
FIG. 2B is a graph showing an aberration at an intermediate position of the zoom lens illustrated in FIG. 1.
Figure 2C:
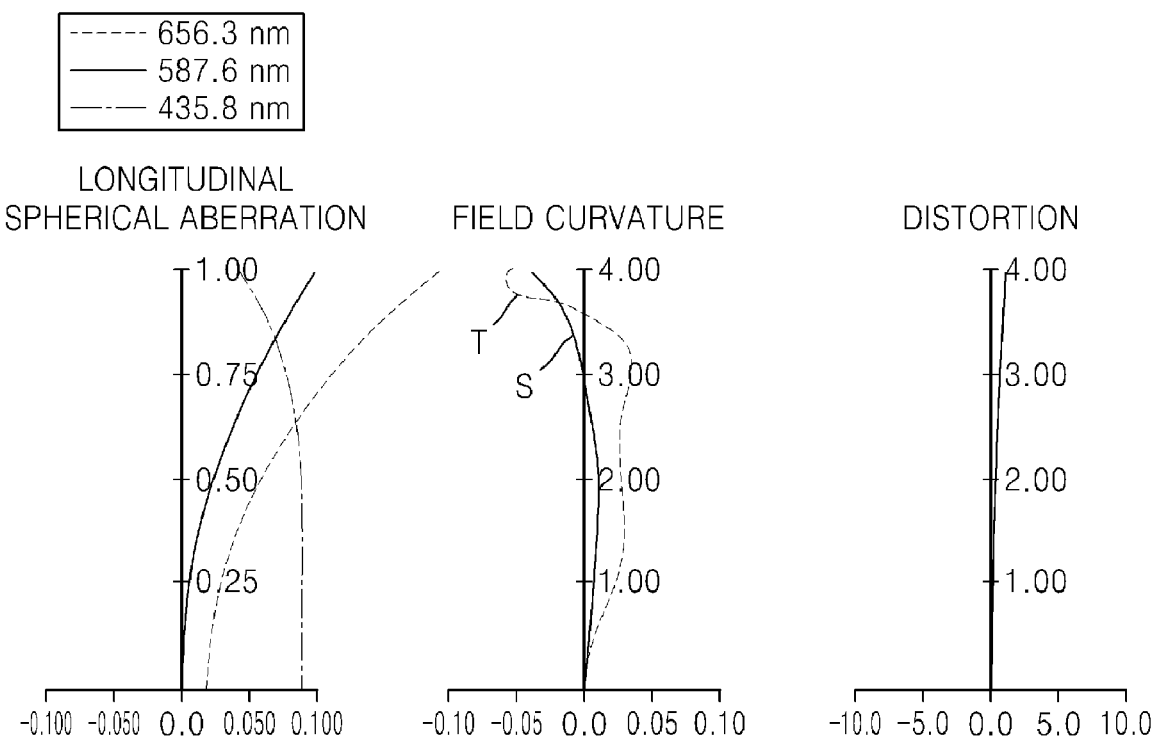
FIG. 2C is a graph showing an aberration at a telephoto position of the zoom lens illustrated in FIG. 1.

FIG. 1 illustrates a structural arrangement of a zoom lens according to embodiments of the invention. FIGS. 2A through 2C are graphs showing aberration at a wide angle position of the zoom lens illustrated in FIG. 1, at an intermediate position thereof, and at a telephoto position thereof, according to embodiments of the invention.

Hereinafter, lens data, aspherical surface data, a photographing distance ∞, a focal length f, an F number Fno, a viewing angle 2ω, an overall length L of the zoom lens, and variable distances D3, D7, D12 and D14 between lenses according to embodiments of the invention will be provided.

| Lens surface | Curvature | Thickness | Refractive index | Abbe number |
|---|---|---|---|---|
| S1 | 21.214 | 0.60 | 2.00069 | 25.5 |
| S2 | 12.320 | 2.55 | 1.80420 | 46.5 |
| S3 | 768.900 | D3 | | |
| S4 | −26.427 | 1.00 | 1.80470 | 40.9 |
| S5 | 4.754 | 1.03 | | |
| S6 | 6.592 | 1.35 | 1.94595 | 18.0 |
| S7 | 11.409 | D7 | | |

-continued

| Lens surface | Curvature | Thickness | Refractive index | Abbe number |
|---|---|---|---|---|
| S8 | 4.658 | 1.33 | 1.58913 | 61.0 |
| S9 | −16.578 | 0.10 | | |
| S10 | 4.987 | 1.18 | 1.69350 | 53.3 |
| S11 | −30.616 | 0.40 | 1.80610 | 33.3 |
| S12 | 2.985 | D12 | | |
| S13 | 11.298 | 1.80 | 1.51470 | 63.8 |
| S14 | −97.180 | D14 | | |
| S15 | Infinity | 0.30 | 1.51680 | 64.2 |
| S16 | Infinity | 0.30 | | |
| S17 | Infinity | 0.50 | 1.51680 | 64.2 |
| S18 | Infinity | | | |

| Aspherical coefficient | |
|---|---|
| S4 | |
| k = | 1.56162E+01 |
| A = | 3.00667E−05 |
| B = | 1.70519E−05 |
| C = | −4.65906E−07 |
| D = | 6.26780E−09 |
| S5 | |
| k = | −1.81813E+00 |
| A = | 1.52043E−03 |
| B = | 2.46960E−06 |
| C = | 1.57961E−06 |
| D = | −4.73432E−08 |
| S8 | |
| k = | −1.00000E+00 |
| A = | 2.32462E−04 |
| B = | −5.29122E−06 |
| C = | 0.00000E+00 |
| D = | 0.00000E+00 |
| S9 | |
| k = | 0.00000E+00 |
| A = | 2.97814E−04 |
| B = | 0.00000E+00 |
| C = | 0.00000E+00 |
| D = | 0.00000E+00 |
| S13 | |
| k = | 0.00000E+00 |
| A = | −9.31562E−04 |
| B = | 9.66587E−05 |
| C = | −6.62536E−06 |
| D = | 1.10546E−07 |
| S14 | |
| k = | 0.00000E+00 |
| A = | −1.39882E−03 |
| B = | 1.15129E−04 |
| C = | −7.83441E−06 |
| D = | 1.40850E−07 |

| | Wide-angle position | Intermediate position | Telephoto position |
|---|---|---|---|
| Focal length | 5.72 | 14.80 | 38.27 |
| F N o | 3.57 | 4.74 | 5.95 |
| 2ω | 69.95 | 30.25 | 11.93 |
| L | 35.28 | 37.44 | 44.58 |

-continued

|  | Wide-angle position | Intermediate position | Telephoto position |
|---|---|---|---|
| Variable distance | | | |
| D3 | 0.88 | 6.96 | 14.91 |
| D7 | 13.80 | 5.04 | 0.76 |
| D12 | 5.71 | 8.29 | 14.07 |
| D14 | 2.04 | 4.31 | 1.99 |

Figure 4A:
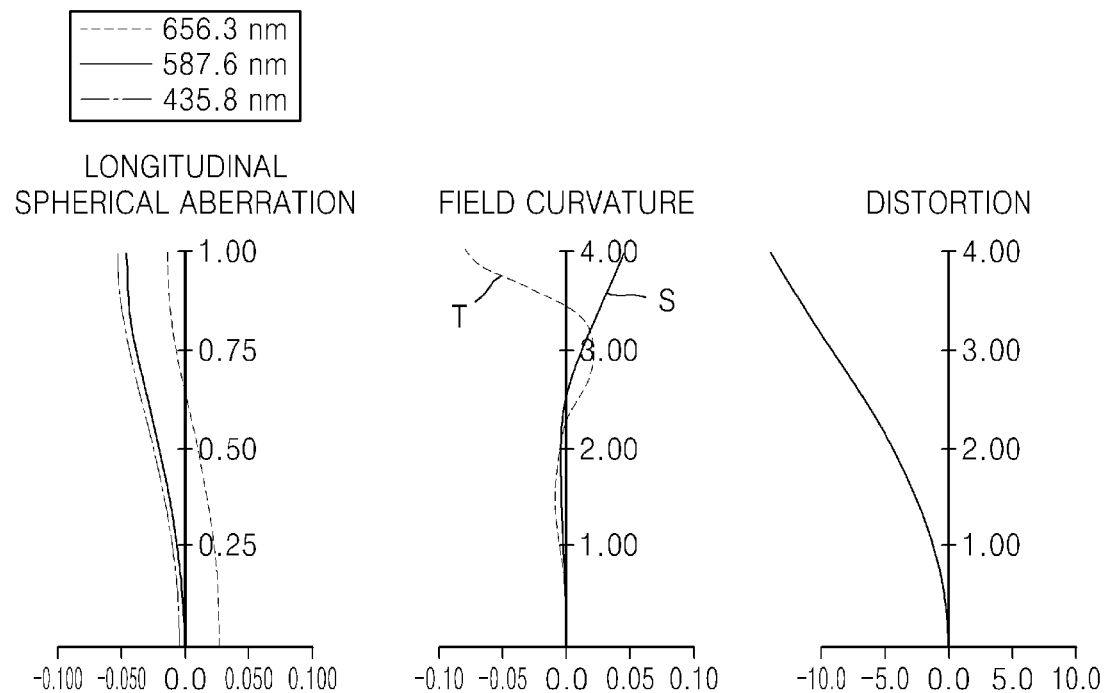
FIG. 4A is a graph showing an aberration at a wide angle position of the zoom lens illustrated in FIG. 3, according to other embodiments of the invention.
Figure 4B:
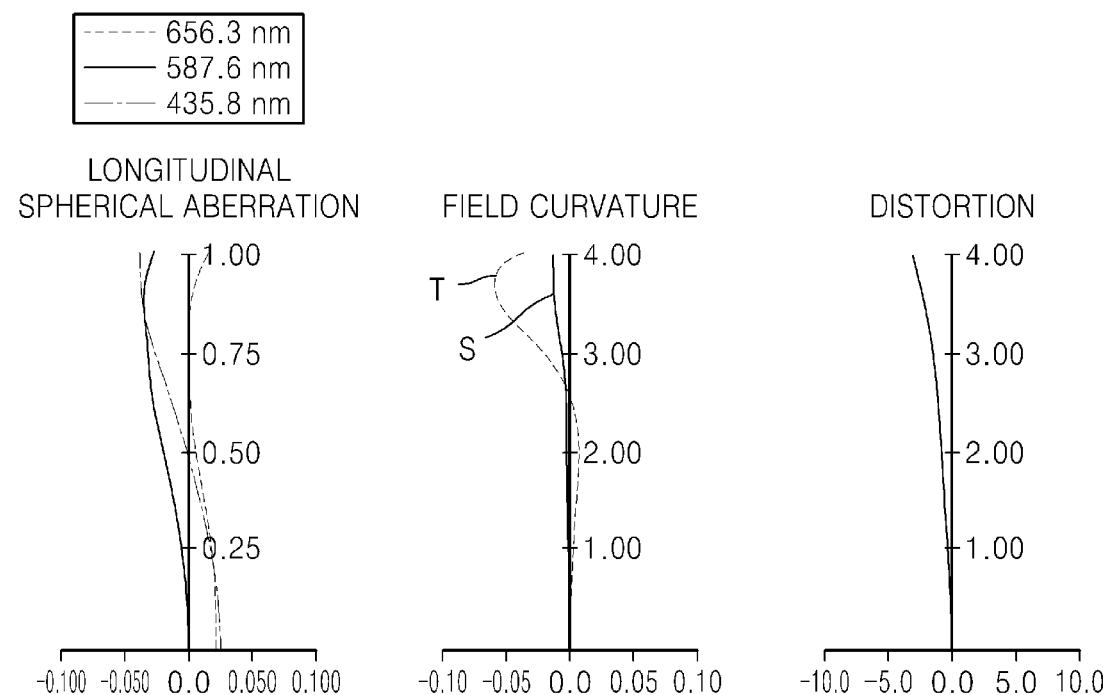
FIG. 4B is a graph showing an aberration at an intermediate position of the zoom lens illustrated in FIG. 3.
Figure 4C:
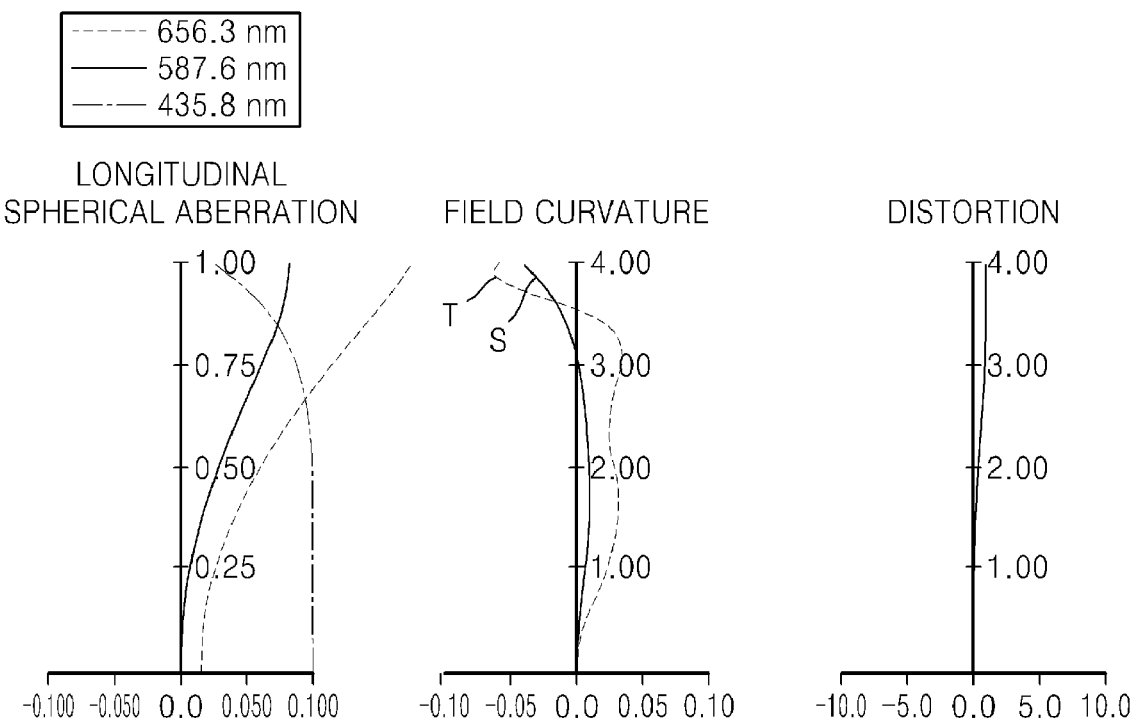
FIG. 4C is a graph showing an aberration at a telephoto position of the zoom lens illustrated in FIG. 3.

FIG. 3 illustrates a structural arrangement of a zoom lens according to other embodiments of the invention. FIGS. 4A through 4C are graphs showing aberration at a wide angle position of the zoom lens illustrated in FIG. 3, at an intermediate position thereof, and at a telephoto position thereof, according to embodiments of the invention.

| Lens surface | Curvature | Thickness | Refractive Index | Abbe number |
|---|---|---|---|---|
| S1 | 21.266 | 0.60 | 2.00069 | 25.5 |
| S2 | 12.330 | 2.55 | 1.80420 | 46.5 |
| S3 | 825.624 | D3 | | |
| S4 | −25.459 | 1.00 | 1.80470 | 40.9 |
| S5 | 4.824 | 1.00 | | |
| S6 | 6.407 | 1.35 | 1.94595 | 18.0 |
| S7 | 10.679 | D7 | | |
| S8 | 4.706 | 1.32 | 1.58913 | 61.0 |
| S9 | −17.037 | 0.10 | | |
| S10 | 4.847 | 1.18 | 1.69350 | 53.3 |
| S11 | −39.885 | 0.40 | 1.80610 | 33.3 |
| S12 | 2.959 | D12 | | |
| S13 | 11.312 | 1.80 | 1.51470 | 63.8 |
| S14 | −100.000 | D14 | | |
| S15 | Infinity | 0.30 | 1.51680 | 64.2 |
| S16 | Infinity | 0.30 | | |
| S17 | Infinity | 0.50 | 1.51680 | 64.2 |
| S18 | Infinity | | | |

| Aspherical Coefficient | |
|---|---|
| S4 | |
| k = | −4.33743E+01 |
| A = | −6.96591E−05 |
| B = | −2.35344E−06 |
| C = | 2.25691E−07 |
| D = | −3.22516E−09 |
| S5 | |
| k = | −1.55877E+00 |
| A = | 1.61471E−03 |
| B = | −8.75409E−06 |
| C = | 5.56161E−07 |
| D = | 2.85896E−08 |
| S8 | |
| k = | −1.00000E+00 |
| A = | 2.64506E−04 |
| B = | −3.05503E−06 |
| C = | 0.00000E+00 |
| D = | 0.00000E+00 |
| S9 | |
| k = | 0.00000E+00 |
| A = | 3.09456E−04 |
| B = | 0.00000E+00 |
| C = | 0.00000E+00 |
| D = | 0.00000E+00 |

-continued

| Aspherical Coefficient | |
|---|---|
| S13 | |
| k = | 0.00000E+00 |
| A = | −9.63638E−04 |
| B = | 9.58945E−05 |
| C = | −6.62536E−06 |
| D = | 1.10546E−07 |
| S14 | |
| k = | 0.00000E+00 |
| A = | −1.44953E−03 |
| B = | 1.15194E−04 |
| C = | −7.83441E−06 |
| D = | 1.40850E−07 |

|  | Wide angle position | Intermediate position | Telephoto position |
|---|---|---|---|
| Focal length | 5.72 | 14.81 | 38.40 |
| F No | 3.55 | 4.76 | 5.94 |
| 2ω | 69.98 | 30.22 | 11.89 |
| L | 35.09 | 37.35 | 44.60 |
| Variable Distance | | | |
| D3 | 0.90 | 6.86 | 14.95 |
| D7 | 13.69 | 5.04 | 0.80 |
| D12 | 5.66 | 8.39 | 14.05 |
| D14 | 2.04 | 4.26 | 2.00 |

Figure 6A:
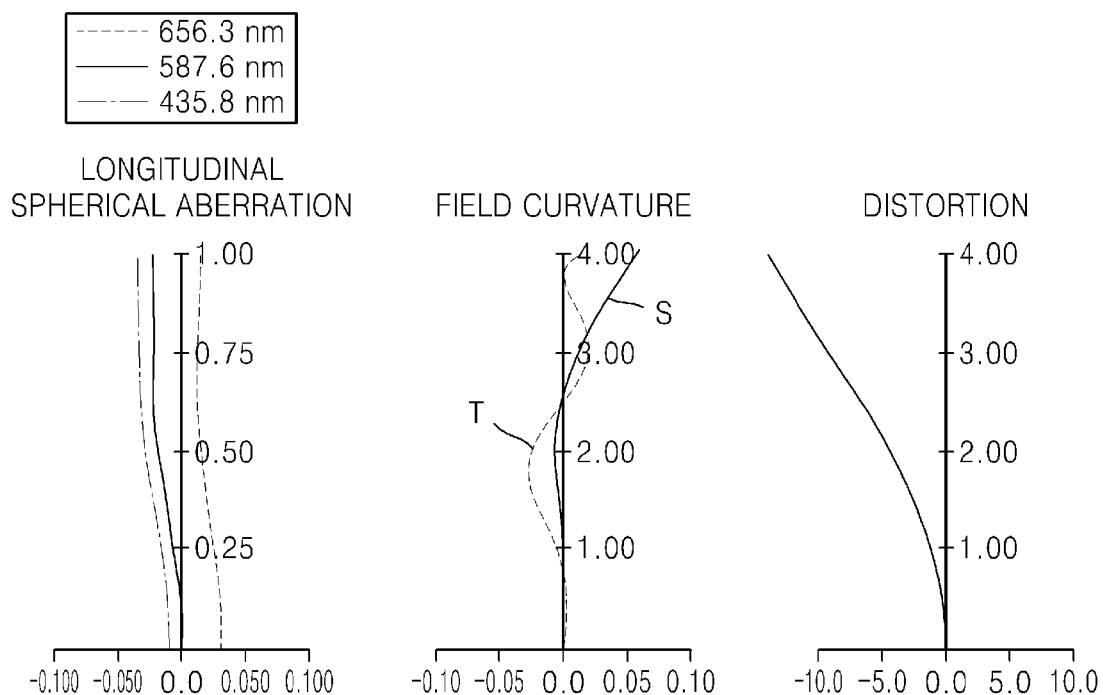
FIG. 6A is a graph showing an aberration at a wide angle position of the zoom lens illustrated in FIG. 5, according to other embodiments of the invention.
Figure 6B:
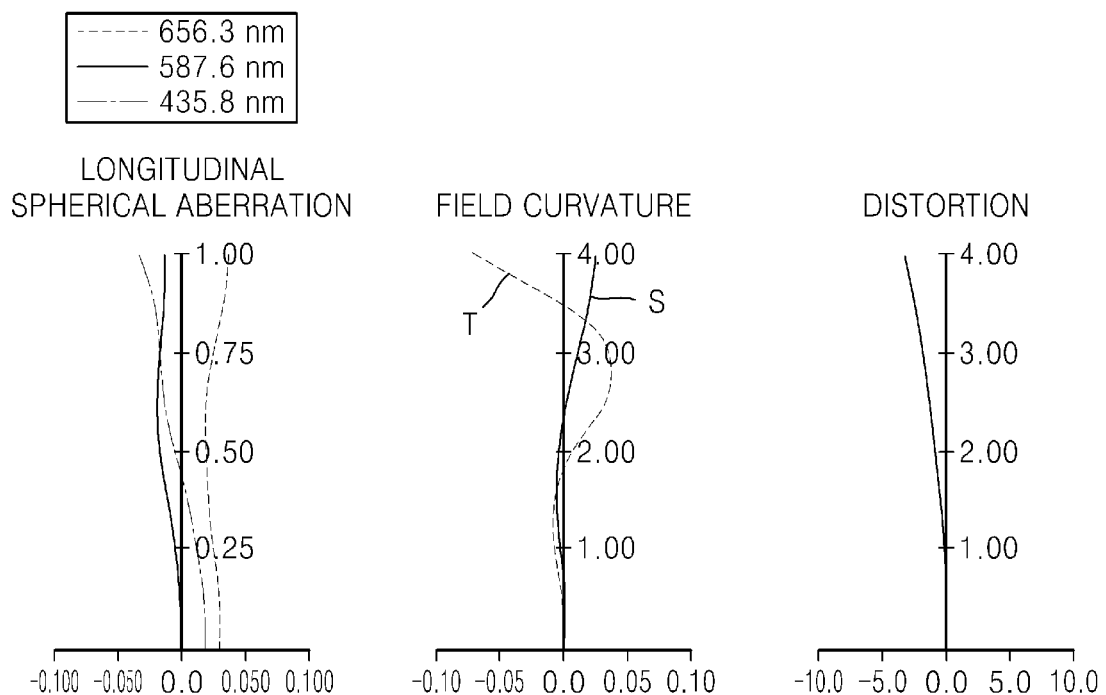
FIG. 6B is a graph showing an aberration at an intermediate position of the zoom lens illustrated in FIG. 5.
Figure 6C:
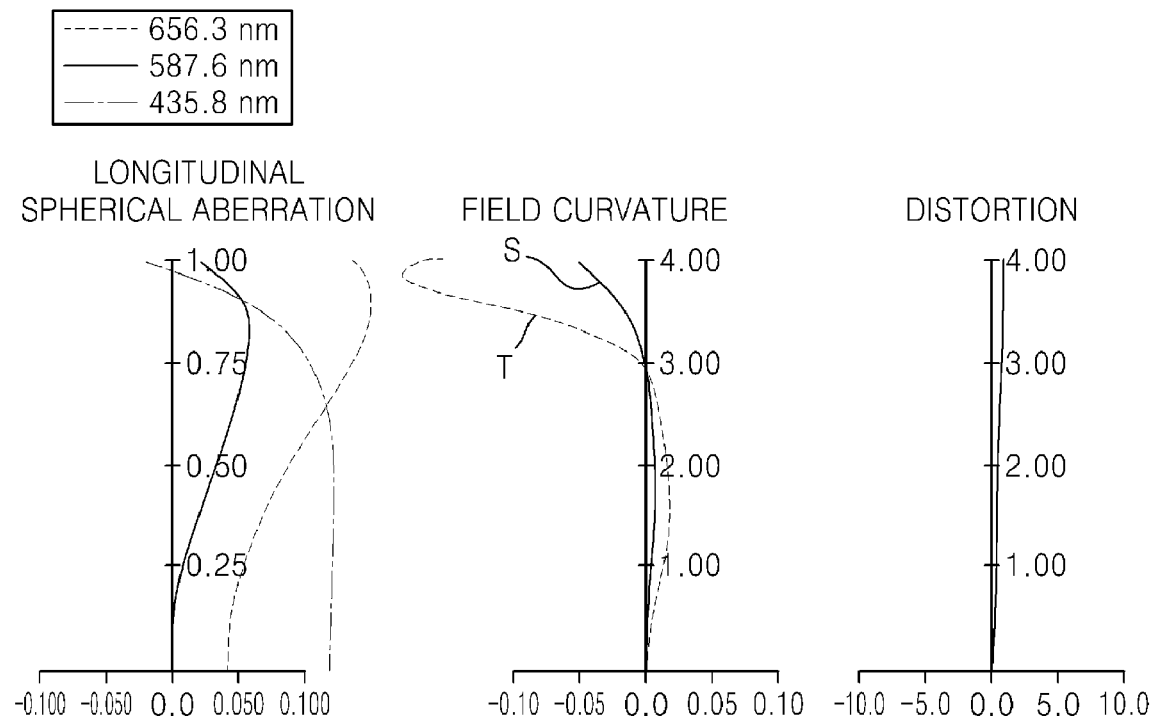
FIG. 6C is a graph showing an aberration at a telephoto position of the zoom lens illustrated in FIG. 5.

FIG. 5 illustrates a structural arrangement of a zoom lens according to other embodiments of the invention. FIGS. 6A through 6C are graphs showing aberration at a wide angle position of the zoom lens illustrated in FIG. 5, at an intermediate position thereof, and at a telephoto position thereof, according to embodiments of the invention.

| Lens suface | Curvature | Thickness | Refractive Index | Abbe number |
|---|---|---|---|---|
| S1 | 25.107 | 0.60 | 2.00178 | 19.3 |
| S2 | 13.559 | 2.55 | 1.91082 | 35.3 |
| S3 | 288.604 | D3 | | |
| S4 | −26.112 | 0.72 | 1.80470 | 40.9 |
| S5 | 4.823 | 0.98 | | |
| S6 | 6.421 | 1.35 | 1.94595 | 18.0 |
| S7 | 10.716 | D7 | | |
| S8 | 4.587 | 1.33 | 1.58913 | 61.0 |
| S9 | −17.078 | 0.10 | | |
| S10 | 4.857 | 1.18 | 1.69350 | 53.3 |
| S11 | −49.940 | 0.40 | 1.80610 | 33.3 |
| S12 | 2.906 | D12 | | |
| S13 | 11.831 | 1.80 | 1.51470 | 63.8 |
| S14 | −90.066 | D14 | | |
| S15 | Infinity | 0.30 | 1.51680 | 64.2 |
| S16 | Infinity | 0.30 | | |
| S17 | Infinity | 0.50 | 1.51680 | 64.2 |
| S18 | Infinity | | | |

| Aspherical Coefficient | |
|---|---|
| S4 | |
| k = | 1.50762E+01 |
| A = | 1.99891E−05 |
| B = | 1.88710E−05 |
| C = | −4.93356E−07 |
| D = | 5.79296E−09 |
| S5 | |
| k = | −1.71473E+00 |
| A = | 1.43908E−03 |
| B = | −8.73554E−06 |
| C = | 3.25128E−06 |
| D = | −9.90370E−08 |
| S8 | |
| k = | −9.72646E−01 |
| A = | 2.85067E−04 |
| B = | −5.09863E−05 |
| C = | 0.00000E+00 |
| D = | 0.00000E+00 |
| S9 | |
| k = | 0.00000E+00 |
| A = | 3.75261E−04 |
| B = | −5.47427E−05 |
| C = | 0.00000E+00 |
| D = | 0.00000E+00 |
| S13 | |
| k = | 0.00000E+00 |
| A = | −9.41271E−04 |
| B = | 9.58343E−05 |
| C = | −7.29861E−06 |
| D = | 1.39391E−07 |
| S14 | |
| k = | 0.00000E+00 |
| A = | −1.59807E−03 |
| B = | 1.40543E−04 |
| C = | −1.01860E−05 |
| D = | 2.05191E−07 |

| | Wide angle position | Intermediate position | Telephoto position |
|---|---|---|---|
| Focal length | 5.76 | 14.80 | 38.02 |
| F No | 3.56 | 4.68 | 5.87 |
| 2ω | 69.56 | 30.25 | 12.01 |
| L | 34.49 | 36.65 | 44.00 |
| Variable distance | | | |
| D3 | 0.90 | 7.07 | 15.10 |
| D7 | 13.51 | 4.91 | 0.80 |
| D12 | 5.51 | 7.57 | 13.59 |
| D14 | 2.07 | 4.59 | 2.00 |

In the embodiments of the invention, a vertical axis of graphs of longitudinal spherical aberration represents an F number and the graphs show longitudinal spherical aberration with respect to C-line (656.3 nm), d-line (587.6 nm) and g-line (435.8 nm). In graphs showing field curvature, a vertical axis represents a maximum image height IH, a solid line represents sagittal field curvature S, and a dashed line represents tangential field curvature T. In graphs showing distortion, a vertical axis represents a maximum image height IH.

The following table shows that embodiment of the invention satisfy equations 1 through 9.

TABLE 1

| | Embodiment described in FIGS. 1 through 2C | Embodiment described in FIGS. 3 through 4C | Embodiment described in FIG. 5 through 6C |
|---|---|---|---|
| $n_{d1n}$ | 2.00069 | 2.00069 | 2.00178 |
| $n_{d1p}$ | 1.80420 | 1.80420 | 1.91082 |
| $V_{d1p}-V_{d1n}$ | 21.00 | 21.00 | 15.93 |
| $D_{3t}/Lt$ | 0.334 | 0.335 | 0.343 |
| $|f2/fw|$ | 1.346 | 1.342 | 1.337 |
| $f3/fw$ | 1.588 | 1.574 | 1.548 |
| $T1/T3$ | 1.119 | 1.139 | 1.187 |
| $Da/ft$ | 0.296 | 0.295 | 0.290 |
| $ft/fw$ | 6.693 | 6.719 | 6.601 |

As described above, the zoom lens according to embodiments of the invention has a high zooming magnification and achieves its miniaturization. The zoom lens according to embodiments of the invention can be suitable for use in image forming optical devices including digital still cameras or video cameras using an image sensor, such as a charge coupled device (CCD) or complementary metal oxide semiconductor (CMOS), or mobile phones.

Figure 7:
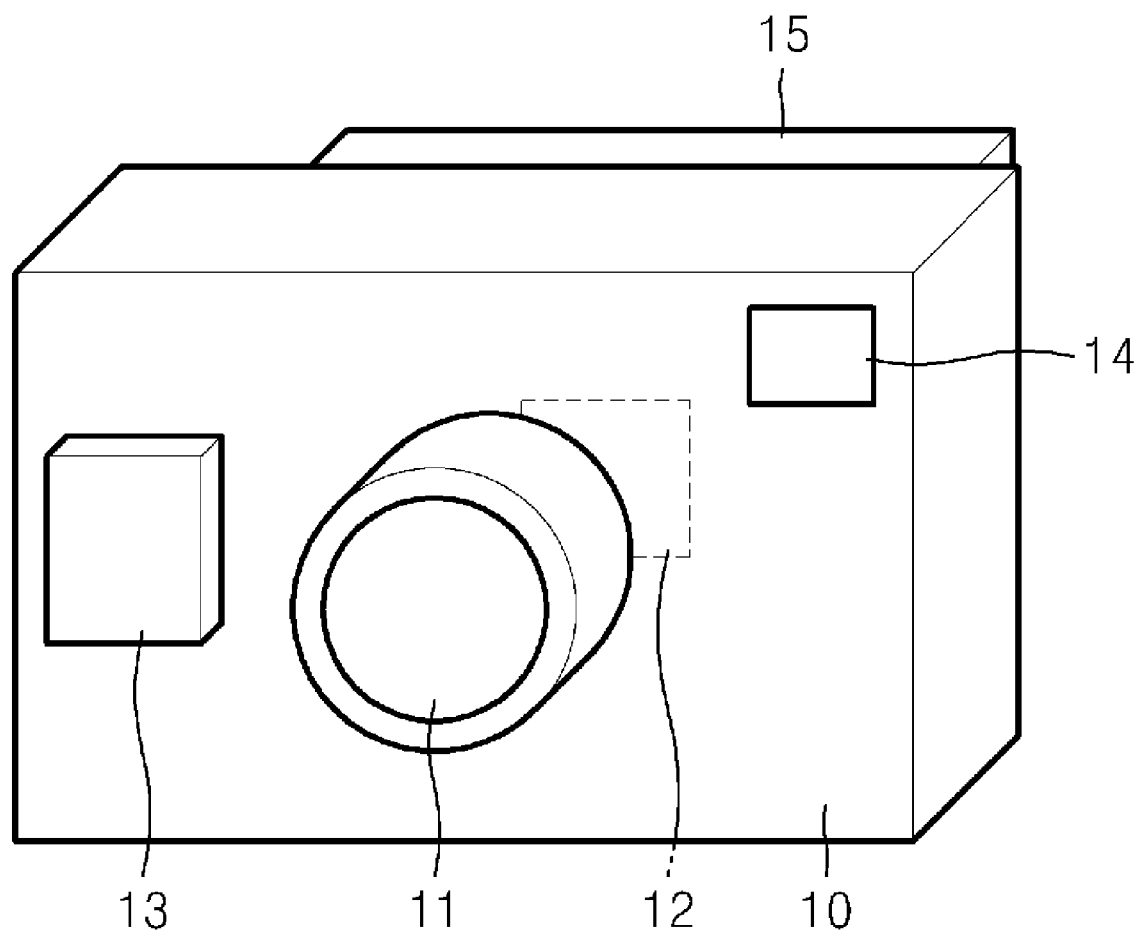
FIG. 7 illustrates an image pickup device according to embodiments of the invention.

FIG. 7 illustrates an image pickup device according to embodiments of the invention. Referring to FIG. 7, the image pickup device includes the zoom lens 11 and an imaging sensor 12 for receiving an optical image formed by the zoom lens 11. The image pickup device may include a recording means 13 for recording data corresponding to a subject image that is photoelectrically converted by the imaging sensor 12, and a view finder 14 for viewing the subject image. The image pickup device further includes an LCD display unit 15 for displaying the subject image. Although FIG. 7 illustrates a camera as an example of an image pickup device, embodiments of the invention are not limited thereto and may be applied to various optical devices in addition to the camera. As described above, the zoom lens 11 is applied to an image pickup device such as a digital camera, so that an optical device having a small size and a high zoom magnification can photograph a subject at a wider angle.

While embodiments of the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
  sequentially from an object side, a first lens group having a positive refractive power, a second lens group having a negative refractive power, a third lens group having a positive refractive power, and a fourth lens group having a positive refractive power,
  wherein the zoom lens is configured so that when the zoom lens is zoomed from a wide angle position to a telephoto position, all of the first lens group, the second lens group, the third lens group, and the fourth lens group move relative to one another so that a distance between the first lens group and the second lens group increases, a distance between the second lens group and the third lens group reduces, and a distance between the third lens group and the fourth lens group increases, wherein the first lens group comprises a negative lens and a positive lens, the negative lens and the positive lens of the first lens group comprises a doublet lens,
wherein the zoom lens satisfies the following expressions:

$$1.9<nd1n<2.1$$

$$1.7<nd1p<2.1$$

$$15<vd1p-vd1n,$$

wherein nd1n denotes a refractive index with respect to a line d of the negative lens of the first lens group, nd1p denotes a refractive index with respect to the line d of the positive lens included in the first lens group, vd1n denotes an Abbe number of the negative lens of the first lens group, and vd1p denotes an Abbe number with respect to the line d of the positive lens of the first lens group,
wherein the third lens group moves perpendicularly to an optical axis to compensate for a hand shake, and
wherein the zoom lens satisfies the following expression:

$$0.5<|f2/fw|<2$$

$$0.5<f3/fw<3,$$

wherein f2 denotes a focal length of the second lens group, f3 denotes a focal length of the third lens group, and fw denotes a total focal length at a wide angle position, and wherein the zoom lens satisfies the following expression:

$$0.3<D3t/Lt<0.5,$$

wherein D3t denotes an air gap distance between the first lens group and the second lens group on an optical axis at a telephoto position, and Lt denotes a distance from the vertex of the lens closest to an object side of the first lens group at a telephoto position to an image plane on the optical axis.

2. The zoom lens of claim 1, wherein the zoom lens satisfies the following expression:

$$0.8<T1/T3<1.5,$$

wherein T1 denotes a distance of movement of the first lens group in a direction of an optical axis when the zoom lens is zoomed from a wide angle position to a telephoto position, and T3 denotes a distance of movement of the third lens group in a direction of the optical axis when the zoom lens is zoomed from the wide angle position to the telephoto position.

3. The zoom lens of claim 1, wherein the zoom lens satisfies the following expression:

$$0.2<Da/ft<0.4,$$

wherein Da denotes a total sum of thicknesses of the first through fourth lens groups on an optical axis, and ft denotes a total focal length of the zoom lens at a telephoto position.

4. The zoom lens of claim 1, wherein the second lens group comprises a negative lens and a positive lens.

5. The zoom lens of claim 4, wherein both surfaces of the negative lens of the second lens group are aspherical.

6. The zoom lens of claim 1, wherein the third lens group comprises a positive lens and a doublet lens including a positive lens and a negative lens.

7. The zoom lens of claim 6, wherein the positive lens of the third lens group closest to the object side comprises at least one aspherical surface.

8. The zoom lens of claim 1, wherein the fourth lens group comprises a positive lens.

9. The zoom lens of claim 1, wherein the fourth lens group comprises at least one aspherical lens.

10. The zoom lens of claim 1, wherein the zoom lens satisfies the following expression:

$$5.0<ft/fw<10.0,$$

wherein ft denotes a focal length at a telephoto position, and fw denotes a focal length at a wide angle position.

11. An image pickup device comprising:
a zoom lens; and
an imaging sensor for receiving an optical image formed by the zoom lens,
wherein the zoom lens comprises sequentially from an object side, a first lens group having a positive refractive power, a second lens group having a negative refractive power, a third lens group having a positive refractive power, and a fourth lens group having a positive refractive power,
wherein, the zoom lens is configured so that when the zoom lens is zoomed from a wide angle position to a telephoto position, all of the first lens group, the second lens group, the third lens group, and the fourth lens group move relative to one another so that a distance between the first lens group and the second lens group increases, a distance between the second lens group and the third lens group reduces, and a distance between the third lens group and the fourth lens group increases,
wherein the first lens group comprises a negative lens and a positive lens, the negative lens and the positive lens of the first lens group comprises a doublet lens,
wherein the zoom lens satisfies the following expressions:

$$1.9<nd1n<2.1$$

$$1.7<nd1p<2.1$$

$$1.5<vd1p-vd1n,$$

wherein nd1n denotes a refractive index with respect to a line d of the negative lens included in the first lens group, nd1p denotes a refractive index with respect to the line d of the positive lens of the first lens group, vd1n denotes an Abbe number of the negative lens of the first lens group, and vd1p denotes an Abbe number with respect to the line d of the positive lens of the first lens group,
wherein the third lens group moves perpendicularly to an optical axis to compensate for a hand shake, and
wherein the zoom lens satisfies the following expression:

$$0.5<|f2/fw|<2$$

$$0.5<f3/fw<3,$$

wherein f2 denotes a focal length of the second lens group, f3 denotes a focal length of the third lens group, and fw denotes a total focal length at a wide angle position, and wherein the zoom lens satisfies the following expression:

$$0.3<D3t/Lt<0.5,$$

wherein D3t denotes an air gap distance between the first lens group and the second lens group on an optical axis at a telephoto position, and Lt denotes a distance from the vertex of the lens closest to an object side of the first lens group at a telephoto position to an image plane on the optical axis.

12. The image pickup device of claim 11, wherein the second lens group comprises a negative lens and a positive lens.

13. The image pickup device of claim 12, wherein both surfaces of the negative lens of the second lens group are aspherical.

14. The image pickup device of claim 11, wherein the zoom lens satisfies the following expression:

$$5.0 < ft/fw < 10.0,$$

wherein ft denotes a focal length at a telephoto position, and fw denotes a focal length at a wide angle position.

15. The image pickup device of claim 11, wherein the zoom lens satisfies the following expression:

$$0.8 < T1/T3 < 1.5,$$

wherein T1 denotes a distance of movement of the first lens group in a direction of an optical axis when the zoom lens is zoomed from a wide angle position to a telephoto position, and T3 denotes a distance of movement of the third lens group in a direction of the optical axis when the zoom lens is zoomed from the wide angle position to the telephoto position.

16. The image pickup device of claim 11, wherein the zoom lens satisfies the following expression:

$$0.2 < Da/ft < 0.4,$$

wherein Da denotes a total sum of thicknesses of the first through fourth lens groups on an optical axis, and ft denotes a total focal length of the zoom lens at a telephoto position.

17. The image pickup device of claim 11, wherein the third lens group comprises a positive lens and a doublet lens including a positive lens and a negative lens.

18. The image pickup device of claim 17, wherein the positive lens of the third lens group closest to the object side comprises at least one aspherical surface.

* * * * *